United States Patent Office 3,196,147
Patented July 20, 1965

3,196,147
4-O-ALKYL-5,5-DIALKYL-L-XYLOSE
DERIVATIVES
Joseph Kiss, Basel, Switzerland, assignor to Hoffmann-La Roche Inc., Nutley, N.J., a corporation of New Jersey
No Drawing. Filed Oct. 4, 1962, Ser. No. 228,257
Claims priority, application Switzerland, Oct. 13, 1961, 11,896/61
8 Claims. (Cl. 260—209)

The present invention relates to a process for the preparation of L-pentose derivatives by hydrolyzing 5,5-dialkyl-(or diaryl)-4-O-alkyl-2-O - acylaminobenzoyl - L-xylopyranose to form 5,5-dialkyl-(or diaryl)-4-O-alkyl-L-xylopyranose and epimerizing the latter compound.

The above pentose derivatives contain an alkyl group in the 4-position, preferably a lower alkyl group, e.g., methyl, ethyl, propyl, or butyl; and contain alkyl or aryl groups in the 5-position. The alkyl groups in 5-position are preferably groups containing 1–5 carbon atoms, i.e. methyl, ethyl, propyl, isopropyl, butyl, isobutyl, pentyl and isopentyl, particularly methyl. The aryl groups are preferably phenyl groups which may be substituted by alkyl groups, particularly by methyl; by alkoxy groups, particularly methoxy; or by halogen atoms. The acylaminobenzoyl group in the 2-position of the 5,5-dialkyl-(or diaryl)-4-O-alkyl-2-O-acylaminobenzoyl-L - xylopyranose suitably contains a para-substituted aromatic carboxylic acid, or a derivative of this acid; the para-substituent being a benzoylamino group.

The derivatives of L-xylopyranose which are employed in the present process are new compounds which can be prepared from 1,2-monoisopropylidene-3,5,6 - tri - O-benzyl-D-glucofuranoside. This D-glucofuranoside is a known compound which can be prepared from D-glucose through its 1,2-isopropylidene derivative benzylated in the 3-, 5-, and 6-positions.

The further steps to synthesize the starting materials of the present process can be carried out as follows: 1,2-isopropylidene-3,5,6-tri-O-benzyl - D - glucofuranoside is heated with a lower aliphatic alcohol in an anhydrous acid medium to convert it into the corresponding alkyl glucofuranoside. The alkyl glucofuranoside is obtained as an anomeric mixture. Preferably the isopropylglucoside is prepared since this is easier to cleave than the corresponding methylglucoside.

The alkylglucoside, preferably lower alkyl and especially the 1-isopropyl-3,5,6-tri-O-benzyl-D - glucofuranoside, prepared above, is alkylated in a further step with dialkylsulfate, e.g. dimethyl-or diethylsulfate. The free hydroxyl group on the $C_2$-position reacts with the alkylating agent to form 1-alkyl-2-O-alkyl-3,5,6-tri-O-benzyl-D-glucofuranoside, which is obtained as the anomeric mixture, and which can be separated from the nonalkylated by-product through selective adsorption on aluminum oxide.

The 1-alkyl-2-O-alkyl-3,5,6-tri-O-benzyl - D - glucofuranoside is reacted in a glucoside solvolysis reaction, carried out in an organic solvent miscible with water which contains at least 1 mol. of water at elevated temperatures. The solvent for this reaction is preferably acetic acid, but other solvents, such as acetonitrile, dimethylformamide, and others, can be used. The solvolysis can be catalyzed, for example, by a metal halide of the second group of the periodic system, e.g., zinc chloride, zinc bromide, calcium chloride, calcium bromide, or magnesium chloride.

The resulting 1-hydroxy-2-O-alkyl-3,5,6-tri-O - benzyl-D-glucofuranoside can be oxidized to the corresponding gluconolactone without further purification at low temperatures in methyl alcohol using an aqueous suspension of a bromocarboxylic acid amide, preferably bromourea.

By reaction of the resulting 2-O-alkyl-3,5,6 - tri - O-benzyl-γ-D-gluconolactone with an alkyl or aryl magnesium halide in a Grignard reaction, wherein at least 2 mol. of organo-metallic compound is employed to 1 mol. of lactone and the reaction product hydrolyzed, a 1,1-dialkyl-(or diaryl)-2-O-alkyl-3,5,6-tri-O-benzyl - D - gluconohexitol is obtained. Preferably a methyl magnesium halide such as the iodide, bromide, or chloride is employed. However, higher alkyl magnesium halides or aryl magnesium halides can be employed in the above Grignard reaction.

Before the $C_3$-, $C_5$-, and $C_6$-benzyl groups of the substituted-γ-D-gluconohexitol can be hydrogenolytically split off, the $C_4$-hydroxyl group must be masked. By use of a molar quantity or a slight excess of an aliphatic or aromatic carboxylic acid or functional derivative thereof capable of reaction, the secondary hydroxyl group in the 4-position is exclusively esterified. Preferably the condensation is carried out with p-benzoylaminobenzoyl derivatives to give compounds that are stable, readily crystallized, and easily cleaved.

1,1-dialkyl-(or diaryl)-2-O-alkyl-3,5,6 - tri-O - benzyl-D-gluconohexitol is reacted with p-nitrobenzoyl-chloride in pyridine at a low temperature to form the 1,1-dialkyl-(or diaryl)-2-O-alkyl-3,5,6-tri-O-benzyl-4-p-nitrobenzoyl-D-gluconohexitol. The latter compound is dissolved in crude condition in ethyl acetate and hydrogenated in the presence of Raney nickel under normal conditions to form 1,1-dimethyl-2-O-methyl-3,5,6-tri-O - benzyl - 4 - p-aminobenzoyl-D-gluconohexitol.

The 4-p-aminobenzoyl derivative is dissolved in pyridine and reacted in the cold with an acyl halide, e.g., benzoyl-chloride, to form the corresponding 4-p-acylaminobenzoyl ester.

Alternatively, the above p-acylaminobenzoyl ester can be prepared in a single step through the reaction of a functional derivative of p-acylaminobenzoic acid with the 4-hydroxy-D-glucose derivative.

In the following step the 1,1-dialkyl-(or diaryl)-2-O-alkyl-3,5,6-tri-O-benzyl-4-p - acylaminobenzoyl - D - gluconohexitol is reductively debenzylated to 1,1-dialkyl-(or diaryl)-2-O-alkyl-4-p-acylaminobenzoyl-D - gluconohexitol. The hydrogenation can be carried out catalytically or chemically. If catalytically, which is the preferred process, it is carried out in the presence of Raney nickel, platinum, or especially palladium. The hydrogenation is accelerated by the addition of acid, and the reduction temperature should not rise above 50° C. A preferred method of carrying out this process consists of dissolving the starting material in methanol and adding solid carbon dioxide as the acid. The hydrogenation is carried out at room temperature in the presence of a palladium catalyst. If it is desired to carry out the hydrogenation by use of chemical means, it can be done, for example, in liquid ammonia with the help of an alkali metal in the presence of a solvent such as the cyclic ethers, e.g., dioxane or tetrahydrofuran.

In a final step in the preparation of the 5,5-dialkyl-(or diaryl)-4-O-alkyl-2-O-acylaminobenzoyl-L-xylopyranose, used as the starting material in the process of the invention, the above hydrogenation product undergoes a glycol cleavage. By means of lead tetraacetate, sodium periodate or periodic acid in an organic solvent such as methylene chloride, benzene, chloroform, or glacial acetic acid, the hydroxymethyl group is split off at room temperature by oxidative decomposition. The product is the lactone of 5,5-dialkyl-(or diaryl)-4-O-alkyl-2-O-acylaminobenzoyl-L-xylose, i.e. 5,5-dialkyl-(or diaryl)-4-O-alkyl-2-O-acylaminobenzoyl-L-xylopyranose, which is a compound that crystallizes well. This can be converted to the desired L-pentose derivative as such or by means of its 1-alkyl-glycoside.

According to one process of the invention, 5,5-dialkyl- (or diaryl)-4-O-alkyl-2-O-acylaminobenzoyl-L-xylopyranose is saponified to the desired L-pentose derivative, for example, to noviose and its analogs, by the activity of aqueous alkali, particularly of an aqueous-alcoholic solution of sodium or potassium hydroxide, in one operation, which at the same time achieves epimerization of the product.

However, to prepare a purer product in better yield, a three-step process is employed:

(a) 5,5 - dialkyl-(or diaryl)-4-O-alkyl-2-O-acylaminobenzoyl-L-xylopyranose is converted to a crystalline, stable glycoside with an aliphatic or araliphatic alcohol in an acid medium, particularly in dilute mineral acid, such as hydrochloric acid, preferably in the presence of p-toluenesulfonic acid. Examples of aliphatic and araliphatic alcohols that can be employed include methyl, ethyl and benzyl alcohol.

(b) This glycoside is saponified under mild alkaline conditions to the corresponding alkyl-(or aryl)-β-(or α)-epinovioside. By mild alkaline conditions is meant the working in a dilute aqueous solution of an alkali or alkaline earth metal hydroxide or of ammonia, which solution contains an organic solvent miscible with water, such as methanol, ethanol, dioxane or acetone. When using an alkali or alkaline earth metal hydroxide, the solutions are preferably 0.01–3 N, while in the case of ammonia, the solutions are preferably 0.01–5 N.

(c) The epi-noviosloe or an analog thereof is cleaved by the action of a dilute mineral acid, e.g., of 0.1–5 N sulfuric acid, hydrochloric acid or phosphoric acid, or of a strong organic acid, such as trifluoroacetic acid, to the free epi-noviose (5,5-dimethyl-4-O-methyl-L-xylose) or an analog thereof. The pentose derivative so-obtained is purified through crystallization.

The above product can be epimerized, for example, through treatment with aqueous alkaline earth hydroxides, such as barium or calcium hydroxide. From the equilibrium the higher melting noviose or an analog thereof can be separated through fractional distillation.

Noviose and epi-noviose derivatives are useful starting materials for the synthesis of novobiocin and its analogs.

*Example 1*

10.0 g. of 1,2-isopropylidene-3,5,6-tri-O-benzyl-D-glucofuranoside is dissolved in 150.0 ml. of isopropyl alcohol, containing 0.5% hydrogen chloride, and is heated under reflux on a steam bath for 2.5 to 3 hours. The solution is cooled to 30° C., 30.0 g. of calcium carbonate added under stirring, and the stirring continued overnight. The solid residue is removed by filtration and the solution evaporated under vacuum at about 40° C. (bath temperature). The oily residue is taken up in 250 ml. of ether and washed three times, each time with 150 ml. of water, then dried over sodium sulfate, and the solvent removed. A clear oil remains, which can be fractionated on $Al_2O_3$ (activity grade I). The crude anomeric 1-isopropyl-3,5,6-tri-O-benzyl-D-glucofuranoside is obtained pure enough to be used without further workup. $[\alpha]_D^{22} = -30.02°$ (c.=1.652 in benzene); $n_D^{22} = 1.5460$ IR: hydroxyl band at 3450 cm.$^{-1}$.

*Example 2*

70.0 g. of 1-isopropyl-3,5,6-tri-O-benzyl-D-glucofuranoside (anomeric mixture, crude product) is dissolved in 1040 ml. of acetone in a three-liter, three-necked flask. Then 415 ml. of dimethylsulfate and 695 ml. of potassium hydroxide solution in two dropping funnels is dropped into the flask in proportional quantities with mechanical stirring at 50° C. for six hours. The reaction mixture is then heated for another hour at 90° bath temperature. The cooled solution is diluted with 2 liters of water, extracted with 2 liters of ether, and the ether solution washed until neutral with sodium chloride solution, and then with water. The ether solution is dried over potassium carbonate, evaporated, and the residual oil (76.7 g.) dissolved in 215 ml. of benzene and chromatographed on 150 g. ($Al_2O_3$, activity grade I), and then washed with 1 liter of benzene. The evaporated benzene eluate yields a bright yellow oil. The product consists of homogeneous pure anomeric 1-isopropyl-2-O-methyl-3,5,6-tri-O-benzyl-D-glucofuranoside, which is suitable for use in the following step without further purification. The substance can be distilled in small batches; boiling point 240°/0.06 Torr. IR: The substance is hydroxyl free.

*Example 3*

10.0 g. of 2-O-methyl-3,5,6-tri-O-benzyl-α,β-isopropyl-D-glucofuranoside is dissolved in 100 ml. of 60% acetic acid, and after the addition of 1.0 g. of calcium bromide, heated on an oil bath for 4 to 6 hours under reflux. The clear solution is evaporated at 40–50° C., the residual oil taken up in 150 ml. of ether and washed until neutral with sodium bicarbonate solution and then with water. The ether solution is dried over sodium sulfate and evaporated. The residue, a yellow oil, is 2-O-methyl-3,5,6-tri-O-benzyl-D-glucofuranoside, which is suitable for use in the following step without further purification. IR: Hydroxyl band at 3450–3500 cm.$^{-1}$.

*Example 4*

In a five-liter, four-necked sulfonation flask, which is fitted with stirrer, dropping funnel and thermometer and placed in an ice bath, 133 g. of finely powdered urea and 128 g. of precipitated calcium carbonate is introduced, and made into a paste with 133 ml. of water. To the pasty mass 298 g. of bromine is slowly dropped in while cooling with ice during the course of 2 to 3 hours. The reaction mixture is cooled for another 2 hours with stirring.

200 g. of 2-O-methyl-3,5,6-tri-O-benzyl-D-glucofuranoside (0.43 mol.) is dropped into 1800 ml. of methyl alcohol, and the above bromocarbamide suspension added through a dropping funnel during the course of 30 minutes at a temperature of 5–20° C. while cooling with ice and maintaining good stirring. The reaction mixture is stirred while cooling with ice for another 2 hours, and then overnight. The contents of the flask, without further cooling in ice, are poured into an eight-liter separatory funnel, diluted with 3000 ml. of water and with 1500 ml. of ether, and extracted with careful shaking. The aqueous alcohol phase is shaken another two times with 1000 ml. of ether, and the ether extracts combined. The combined ether extracts are washed twice with 1000 ml. of water, twice with 400 ml. of 20% sodium bisulfite solution (to remove bromine), twice with 100 ml. of water, twice with 500 ml. of sodium bicarbonate solution (about 10%), and finally washed with water until the last extract is neutral to litmus paper. The dark yellow ether solution is dried over sufficient sodium sulfate and evaporated under vacuum at 40° C. The residual oily 2-O-methyl-3,5,6-tri-O-benzyl-γ-D-gluconolactone has a red-brown color and is transparent. The crude lactone can be used further without additional purification. However, if desired, the crude lactone can be purified over a ten-fold quantity of Florisil (60–100 mesh) (Floridin Company), by first dissolving the oily residue in benzene and then in various percent benzene-ether mixtures. $[\alpha]_D^{25} = +32.3°$ (c.=5 in benzene); $n_D^{22} = 1.5524$.

*Example 5*

181.0 g. of magnesium shavings are added with 3150 ml. of absolute ether to a ten-liter, four-necked sulfonation flask. Then methylbromide is introduced (5 to 6 hours) until the magnesium is dissolved. Then 300 g. of 2-O-methyl-3,5,6-tri-O-benzyl-γ-D-gluconolactone (crude product from the bromocarbamide oxidation) is dissolved in 4150 ml. of absolute benzene and dropped into a reaction vessel with vigorous stirring under reflux (3 to 4 hours). The ether is distilled off and 2 to 3 liters of benzene added to the residue. The benzene solution is heated under reflux for an additional 4 to 5 hours. The reaction mixture is carefully transferred to a distillation flask containing a quantity of ice with stirring, and hydrochloric acid added until the reaction mixture is acid to congo paper. The magnesium shavings are separated and the benzene solution washed with sodium bicarbonate solution and water until neutral. The clear benzene solution is dried over sodium sulfate and evaporated under vacuum at 40° C. (bath temperature). The obtained crude product is taken up in one liter of benzene and chromatographed on 1.5 kg. of silica gel. The analytically pure 1,1-di-C-methyl-2-O-methyl-3,5,6-tri-O-benzyl-D-gluconohexitol can be removed with ether. It is a bright yellow oil $[\alpha]_D^{22} = -63.5°$ (c.=2.1 in benzene).

*Example 6*

122.6 g. of dimethylgluconohexitol is dissolved in 400 ml. of absolute pyridine and 57.1 g. of p-nitrobenzoyl chloride added in portions under stirring with cooling in an ice bath; the temperature of the reaction mixture not being allowed to rise above +5° C. The reaction mixture is stirred overnight at 20° C. The contents of the flask are poured onto 3 kg. of ice and, while stirring, HCl added until the mixture is acid to congo paper. The acylated product is extracted three times, each time with 1 liter of ether. The ether extracts are combined and washed seriatim with ice water, bicarbonate solution, and lastly with water until neutral. The combined ether extracts are dried over sodium sulfate and evaporated under vacuum at 40° C. 167 g. of the p-nitrobenzoylated product is obtained in the form of a yellow oil, which can be used in the following step without purification. 167.0 g. of the p-nitrobenzoylated product is dissolved in 1.5 liters of ethyl acetate, and hydrogenated while shaking in a five-liter round bottom flask with about 6.0 g. of Raney nickel and about 6.0 g. of Norite. In 3 to 5 hours the solution takes up the theoretical quantity of hydrogen. The catalyst is filtered off, the solution evaporated, and the oily p-aminobenzoyl ester obtained is used for further acylation. 21.5 g. of the p-aminobenzoyl ester is dissolved in 158 ml. of absolute pyridine and 5.37 g. of benzoylchloride added dropwise with stirring and cooling with ice to 0–5° C. The reaction mixture is stirred overnight at 20° C. The contents of the flask are then poured over ice, acidified with HCl until acid to congo paper, extracted with ether, and worked up in the preceding manner. The obtained 1,1-di-C-methyl-2-O-methyl-3,5,6-tri-O-benzyl-4-(p-benzoylaminobenzoyl)-D-gluconohexitol is purified by chromatography with a six-fold quantity of silica gel. The benzene-ether fraction (75:25) contains the analytically pure substance $[\alpha]_D^{22} = +33.0°$ (c.=2.4 in benzene).

*Example 7*

100 g. of the above p-benzoylaminobenzoyl ester are dissolved in about 2 liters of methanol and hydrogenated with 3.0 g. of palladium-on-charcoal and about 3.0 g. of activated charcoal under usual hydrogenation conditions. After the theoretical quantity of hydrogen is taken up, the solution is filtered and evaporated under vacuum. A solid, transparent resin remains, which is treated with 200 ml. of ethyl acetate with warming. The 1,1-di-C-methyl-2-O-methyl-4-benzoylaminobenzoyl - D - gluconohexitol, which is difficulty soluble in ethyl acetate, is filtered off with suction. The isolated snow white crystals are recrystallized from a large quantity of ethyl acetate; melting point 168–170° C. $[\alpha]_D^{22} = +8.0°$ (c.=1.624 in methanol).

*Example 8*

50.0 g. of 1,1-di-C-methyl-2-O-methyl-4-p-benzoylaminobenzoyl-D-gluconohexitol is dissolved in 1 liter of glacial acetic acid, and 5.5 g. of lead tetraacetate added thereto. The clear reaction mixture is shaken for 4 to 5 hours at 22° C. Then water is added until turbidity, and the solution evaporated at 40° C. (bath temperature) under vacuum to 4–500 ml. After several additions of water the solution is concentrated under vacuum to 300 ml., the 2-p-benzoylaminobenzoyl-4-O-methyl-5,5-di-C-methyl-L-xylose, which precipitates in white crystals, is filtered under vacuum and the filtercake washed with water. The product is dried at 50–60° in a vacuum jar. A snow white powder, melting point 206–208° C. is obtained. The product can be recrystallized from a mixture of isopropyl alcohol-petroleum ether. Glistening microscopic prisms are obtained, melting point 214–215° C. $[\alpha]_D^{22} = -29.0°$ (c.=0.345 in ethyl acetate). Its 1,3-diacetyl derivative is prepared in pyridine with acetic anhydride; melting point 157–158° C. (from ethyl acetate-petroleum ether) $[\alpha]_D^{22} = -45.1°$ (c.=1.06 in CHCl$_3$).

*Example 9*

52.3 g. of the above 2-benzoylaminobenzoyl-epi-noviose, and 10.5 g. of p-toluenesulfonic acid are dissolved in 1.6 liters of absolute methonal and heated under reflux for 2.5 hours. The clear methanol solution is evaporated under vacuum at a 40° C. bath temperature to about 100 ml., and then cooled. The 2-p-benzoylaminobenzoyl - 4 - O - methyl - 5,5 - di - C - methyl - β-methyl-L-xyloside (2 - p - benzoylaminobenzoyl-β-methyl-epi-novioside) which precipitates in crystals is filtered off with suction. The crystals (85.1 g.) are washed on the filter with isopropanol; melting point 229° C. Additional β-methylglycoside can be obtained from the mother liquor. By recrystallization from a mixture of ethyl acetate and petroleum ether, the analytically pure material can be obtained; melting point 230° C. $[\alpha]_D^{22} = +0.5°$ (c.=0.3 in CHCl$_3$). The 3-O-acetyl derivative is reacted in pyridine solution with acetic anhydride, melting point 156–157° (from ethyl acetate in petroleum ether). $[\alpha]_D^{22} = -8.3°$ (c.=0.53 in CHCl$_3$). The β-benzylglycoside can be obtained from 2-p-benzoylaminobenzoyl-epi-noviose (5.0 g.) and benzyl alcohol (50.0 ml.) in the presence of p-toluenesulfonic acid (1.0 g.) (3 hours on a steam bath). Glistening needles from a mixture of ethyl acetate and petroleum ether are obtained; melting point 182–183° C. $[\alpha]_D^{22} = +20.5°$ (c.=1.04 in CHCl$_3$). Its 3-acetyl derivative is obtained in pyridine solution with acetic anhydride. For analysis, the product can be recrystallized from a mixture of ethyl acetate-petroleum ether; melting point 156–156.5° C. $[\alpha]_D^{22} = -71.9°$ (c.=0.47 in CHCl$_3$). The 2-p-benzoylaminobenzoyl-3-acetyl-β-benzyl-epi-noviose can be debenzylated in methanol solution with palladium-on-charcoal. The obtained 1-hydroxy compound is recrystallized from ethyl acetate-petroleum ether; melting point 190–191° C.

$$[\alpha]_D^{22} = +0.38°$$

(c.=0.26 in CHCl$_3$). IR shows ester, amide, and hydroxyl bands. The ethylthio-glucoside of 2-p-benzoylaminobenzoyl-epi-noviose can be prepared in ethylmercaptan solution in the presence of dry hydrogen hydrochloride; melting point 160–162° C. (from ethyl acetate-petroleum ether).

*Example 10*

55.2 g. of 2-p-benzoylaminobenzoyl-β-methyl-epi-novioside is dissolved in 2450 ml. of methanol and heated on a steam bath with 1310 ml. of 0.1 N sodium hydroxide solution for six hours. Thereafter the clear solution is evaporated to dryness and the residual water removed through benzene-azeotropic distillation. The solid residue is extracted under reflux three times, each time with 1 liter of absolute ether. The combined ether extracts are evaporated to dryness and the oily residue, 4-O-methyl-5,5-di-C-methyl-β-methyl-L-xyloside (β-methyl-epi-novioside) taken up in 200–300 ml. of petroleum ether (boiling point 40–45° C.), filtered, and evaporated. A water clear syrup, which can be distilled without decomposition in high vacuum, is obtained. Melting point 112°/0.7 Torr. $[\alpha]_D^{22} = -9.85°$ (c.=0.81 in $CHCl_3$). Its 2,3-diacetyl derivative melts at 85–88° C. (from ethyl acetate-petroleum ether).

*Example 11*

3.74 g. of β-methyl-epi-novioside are dissolved in 375 ml. of 0.5 N sulfuric acid and maintained 1.5 hours at 85° C. Thereafter the sulfuric acid is neutralized with $BaCO_3$, the solution is filtered, and evaporated under vacuum at 45° C. (bath temperature). The viscous residue is dissolved in absolute alcohol, filtered from the insoluble by-products, and evaporated under vacuum. Yield: 3.60 g. The product is dissolved in ethyl acetate with warming and taken up in petroleum ether (boiling point 40–45°). After several days, crystallization of 4-O-methyl-5,5-di-C-methyl-L-xylose (epi-noviose) in the form of beautiful long needles commences; melting point 79–82° C. $[\alpha]_D^{20} = +21.6°$ (c.=0.2 in 50% alcohol). The product readily binds water of crystallization. The epi-noviose can be epimerized through treatment with alkali. 1.0 g. of epi-noviose is treated with 20 ml. of 0.035 N barium hydroxide solution for three hours at 85° C. Thereafter the solution is neutralized with 0.1 N $H_2SO_4$, filtered, and evaporated under vacuum at 45° C. (bath temperature). The residue is dissolved in absolute alcohol, filtered, and evaporated under vacuum. The residue is then dried under high vacuum at 60° C. The water clear syrup is dissolved in anhydrous ethyl acetate with warming, and petroleum ether (boiling point 40–50° C.) added thereto. After a long time the noviose precipitates in the form of colorless prisms; melting point 128–130° C. $[\alpha]_D^{20} = +19.35°$ (c.=0.52 in 50% alcohol).

*Example 12*

415 mg. of 2-p-benzoylaminobenzoyl-4-O-methyl-5,5-di-C-methyl-L-xylose is dissolved in 10 ml. of alcohol on a steam bath and, after the addition of 2 ml. of 1.0 N sodium hydroxide solution, heated to reflux. After 60 minutes the solution is cooled, neutralized with 2 ml. of 1.0 N hydrochloric acid, and evaporated under vacuum. The p-benzoylaminobenzoic acid, which is difficultly soluble in water, can be separated from the sugar by treatment with water. The aqueous solution is evaporated under vacuum. From the residue noviose (5,5-dimethyl-4-O-methyl-L-xylose) is isolated.

I claim:
1. 2-acylaminobenzoyl-4-O-lower alkyl-5,5-di-($C_1$–$C_5$ alkyl)-L-xylose.
2. 2-acylaminobenzoyl-4-O-lower alkyl-5,5-diaryl-1-xylose wherein said diaryl groups are selected from the group consisting of phenyl, methyl-phenyl, methoxy-phenyl, and halogen-substituted phenyl.
3. 2-benzoylaminobenzoyl-4-O-methyl-5,5-dimethyl-L-xylose.
4. 2-acylaminobenzoyl-4-O-lower alkyl-5,5-di-($C_1$–$C_5$ alkyl)-β-lower alkyl-L-xyloside.
5. 2-acylaminobenzoyl-4-O-lower alkyl-5,5-diaryl-β-lower alkyl-L-xyloside wherein said diaryl groups are selected from the group consisting of phenyl, methyl-phenyl, methoxy-phenyl, and halogen-substituted phenyl.
6. 2-benzoylaminobenzoyl-4-O-methyl-5,5-dimethyl-β-methyl-L-xyloside.
7. 4-O-lower alkyl-5,5-diaryl-β-lower alkyl-L-xyloside wherein said diaryl groups are selected from the group consisting of phenyl, methyl-phenyl, methoxy-phenyl, and halogen-substituted phenyl.
8. 4-O-methyl-5,5-dimethyl-β-benzyl-L-xyloside.

References Cited by the Examiner
UNITED STATES PATENTS

| | | | |
|---|---|---|---|
| 2,218,569 | 10/40 | White | 260—210 |
| 2,938,900 | 5/60 | Walton | 260—210 |
| 2,949,449 | 8/60 | Hoffer | 260—210 |

OTHER REFERENCES

Bishop et al., "Canadian Journal of Chemistry," vol. 34, No. 7, July 1956, pp. 845–850.

LEWIS GOTTS, *Primary Examiner.*